United States Patent [19]
Hicks

[11] Patent Number: 6,015,233
[45] Date of Patent: Jan. 18, 2000

[54] SYSTEM FOR MONITORING THE TEMPERATURE OF A ROTATING DEVICES

[75] Inventor: William S. Hicks, Sarasota, Fla.

[73] Assignee: HTI Technologies, Inc., St. Petersburg, Fla.

[21] Appl. No.: 08/995,319

[22] Filed: Dec. 22, 1997

[51] Int. Cl.[7] .......................... G01K 13/08; G08C 19/00
[52] U.S. Cl. ................ 374/153; 340/870.17; 340/870.18
[58] Field of Search ....................... 374/153; 340/870.17, 340/870.18, 870.16

[56] References Cited

U.S. PATENT DOCUMENTS

| | | | |
|---|---|---|---|
| 3,824,857 | 7/1974 | Smith | 340/870.17 |
| 4,140,999 | 2/1979 | Conway | 340/870.18 |
| 4,150,358 | 4/1979 | Aviander | 374/153 |
| 4,518,962 | 5/1985 | Imose et al. | 340/870.17 |
| 5,257,863 | 11/1993 | Chu et al. | 374/153 |
| 5,585,577 | 12/1996 | Lemoine et al. | 374/153 |
| 5,617,084 | 4/1997 | Sears | 340/870.17 |
| 5,642,105 | 6/1997 | Duffy et al. | 340/870.17 |

FOREIGN PATENT DOCUMENTS

| | | | |
|---|---|---|---|
| 24826 | 2/1983 | Japan | 374/153 |
| 1441434 | 11/1988 | U.S.S.R. | 340/870.18 |

OTHER PUBLICATIONS

IBM Technical Disclosure Bulletin, Moving surface temperature sensor, vol. 14 No. 6, Nov. 1997.

*Primary Examiner*—Christopher W. Fulton
*Assistant Examiner*—Quyen Doan
*Attorney, Agent, or Firm*—Stein, Schifino & Van Der Wall

[57] ABSTRACT

An improved system for monitoring the temperature of a rotating device comprising: a sensing means; an antenna means; a receiver means; an amplification means; a first splitting means; a phase lock loop circuit; a second splitting means; an amplitude modulation discriminator means; a comparator; a control line signal; a counter logic circuit; a time based signal; a synchronized signal; and a microprocessor.

8 Claims, 4 Drawing Sheets

SYSTEM FOR MONITORING THE TEMPERATURE OF A ROTATING DEVICES

BACKGROUND OF THE INVENTION

1. Field of the Invention

This invention relates to monitoring the temperature of rotating devices used in industrial applications such as paper milling, textiles, food processing, pharmaceuticals, chemicals, power generation, motors, generators, bearings, engines and the like.

2. Description of the Background Art

In paper milling, textiles, food processing, pharmaceuticals, chemicals and power generation industries the monitoring of temperature is critical. During one or more of the steps involved in the manufacturing process; the product or an ingredient of the product is rotated. The real time measurement of temperatures during this rotation process is accomplished, if at all, by unreliable and inaccurate equipment.

An example of a rotating device is a dryer drum used by the paper milling industry. Another example of a rotating device is the auger used by the food industry. The food processing industry uses a rotating device known as a rotating retort. Yet another example of a rotating device are turbines used in the generation of electricity by the power industry.

A typical application of a rotating device can be demonstrated and more fully understood by examining the use of a rotating drum in the production of paper or textiles as employed by these industries in the manufacture of their respective products.

In the processing of paper or textiles, one of the steps involved is the removal of moisture from the product. The textile or paper materials are typically dried by passing them over the surfaces of a series of cylindrical structures called drums. Because the production rate and the quality of the product are affected by the temperature of the drums, maintaining proper drum temperature is an important aspect of the production process.

One technique currently used for monitoring dryer drum temperatures involves the use of a handheld infrared temperature sensor gun. Temperature readings can be taken by pointing the sensor gun at an exposed surface of a drum. However, such temperature readings must be taken manually and are strongly influenced by the emissivity of the drum. Because drum emissivity can vary depending on the surface condition of the drum (i.e., whether the drum is painted, rusted from exposure to water, shiny, etc.), temperature readings taken using handheld infrared temperature sensors can be grossly inaccurate.

Another technique for monitoring drum temperatures involves using a handheld rubbing-contact temperature sensor. Rubbing-contact temperature sensors typically have wheeled carriages that are placed in rubbing contact with an exposed surface of the rotating drum. Because rubbing-contact sensors are placed in proximity to the moving surfaces of the paper making machinery, the use of such sensors is not without risk to the operator taking the temperature measurement. In addition, typical rubbing-contact sensors are speed rated, so that a given sensor can only be used to make temperature measurements if the drum is rotating below a particular speed.

Still another technique for monitoring drum temperatures involves calculating the drum temperature based on known parameters, such as the pressure of the saturated and super- saturated steam used to heat the interior of the drum. The thickness of the water condensate layer built upon on the inner drum surface, the rate of evaporation on the exterior of the drum, the structure of the drum (i.e., whether the drum has any raised surfaces), etc. can adversely effect these calculations. The results of this type of heat flow analysis tend to be inaccurate, because it is not possible to measure or determine all of the parameters that influence the drum temperature or to precisely gauge the interplay between the various measured parameters and the drum temperature.

It is therefore an object of the present invention to provide an improved technique for monitoring the temperature of rotating devices used in industrial applications such as paper milling, textiles, food processing, pharmaceuticals, chemicals, power generation, motors, generators, bearings, engines and the like.

In response to the realized inadequacies of these systems for monitoring dryer drum temperatures, it became clear that there is a need for a reliable and accurate system for monitoring the temperature of rotating devices used in industrial applications such as paper milling, textiles, food processing, pharmaceuticals, chemicals, power generation, motors, generators, bearings, engines and the like.

This improved system for monitoring the temperature of a rotating device must provide an accurate temperature reading and control in order to maximize the quality and productivity of the processing steps in a manufacturing process. Inasmuch as the art consists of various types of systems for monitoring temperatures, it can be appreciated that there is a continuing need for and interest in improvements to systems for monitoring the temperature of a rotating device, and in this respect, the present invention addresses these needs and interests.

Therefore, the principal object of this invention is to provide an improved system for monitoring the temperature of a rotating device which overcomes the aforementioned inadequacies of the prior art and provides an improvement which is a significant contribution to the advancement of the industrial arts such as paper milling, textiles, food processing, pharmaceuticals, chemicals, power generation, motors, generators, bearings, engines and the like.

Another object of this invention is to provide an improved system for monitoring the temperature of a rotating device which has all the advantages and none of the disadvantages of the earlier systems for monitoring the temperature of a rotating device.

Yet still another object of the present invention is to provide an improved system for monitoring the temperature of a rotating device such that the rotational speed of the rotating device does not affect the accuracy of measured temperature.

Still another object of the present invention is to provide an improved system for monitoring the temperature of a rotating device such that the placement of an antenna is insensitive to minute changes in environment or location for the detection of a signal generated by a sensor on a rotating device.

Still another object is to provide an improved system for monitoring the temperature of a rotating device where the gathering of data is not affected by the infrequency of data collection.

Yet another object is to provide an improved system for monitoring the temperature of a rotating device where the accuracy of the temperature measured will not be degraded by changes in the frequency or amplitude of the signal generated by the sensor on the rotating device.

Still a further object of the present invention is to provide an improved system for monitoring the temperature of a rotating device where the sensor transmits at low frequencies.

Another object of this invention is to provide an improved system for monitoring the temperature of a rotating device employing a magnetic link to detect the signal sent by the sensor to the antenna.

Yet another object is to provide an improved system for monitoring the temperature of a rotating device where transmitted information is obtained in short time periods asynchronously.

Yet another object is to provide an improved system for monitoring the temperature of a rotating device where a binary signal is provided to validate the information received in order to calculate an accurate temperature.

A further object is to provide an improved system for monitoring the temperature of a rotating device comprising: a sensing means; an antenna means; a receiver means; an amplification means; a first splitting means; a phase lock loop circuit; a second splitting means; an amplitude modulation discriminator means; a comparing device; a control line signal; a counter logic circuit; a time based signal; a synchronized signal; and a microprocessor.

The foregoing has outlined some of the pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a more comprehensive understanding of the invention may be obtained by referring to the summary of the invention, and the detailed description of the preferred embodiment in addition to the scope of the invention defined by the claims taken in conjunction with the acompanying drawings.

SUMMARY OF THE INVENTION

The present invention is defined by the appended claims with the specific embodiment shown in the attached drawings. This invention satisfies the need for a reliable and accurate system for monitoring the temperature of a rotating device that may be used in industrial applications such as paper milling, textiles, food processing, pharmaceuticals, chemicals, power generation and the like.

For the purpose of summarizing this invention, this invention comprises a sensing means that is responsive to temperature stimuli from a rotating device. Said sensor means is wireless and operates at a frequency of 262 kHz and other discrete frequencies. An antenna means that is responsive to a transmitted signal from said sensing means. Said antenna means is a pickup coil for receiving the magnetic flux generated by said sensor means. A receiver means that is coupled to said antenna means. Said receiver means is also coupled to an amplification means which then outputs through a first splitting means producing a first amplified signal and a second amplified signal. Said first amplified signal is sent to a phase lock loop circuit. Said phase lock loop circuit outputs to a second splitting means producing a valid frequency signal and said first amplified signal. Said second amplified signal of said first splitting means is sent to an amplitude modulation discriminator means for validating the amplitude of said second amplified signal thereby producing a valid amplitude signal. Said valid amplitude signal and said valid frequency signal are then sent to a comparator for comparison of said respective signals whereby said comparator producing a control line signal. A counter logic circuit receives the signals transmitted by said control line signal, said first amplified signal of said second splitting means of said phase lock loop circuit and a time based signal whereby said respective signals are synchronized. Said counter logic circuit producing a synchronized signal. A microprocessor receives said synchronized signal for calculating the temperature of said rotating device.

Therefore, it can be readily seen that the present invention provides an improved system for monitoring the temperature of a rotating device that can accurately detect the temperature of a rotating device. Thus, an improved system for monitoring the temperature of a rotating device provides capabilities that would be appreciated. The foregoing has outlined rather broadly, the more pertinent and important features of the present invention. The detailed description of the invention that follows is offered so that the present contribution to the art can be more fully appreciated. Additional features of the invention will be described hereinafter. It should be appreciated by those skilled in the art that the conception and the disclosed specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more succinct understanding of the nature and objects of the invention, reference should be directed to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
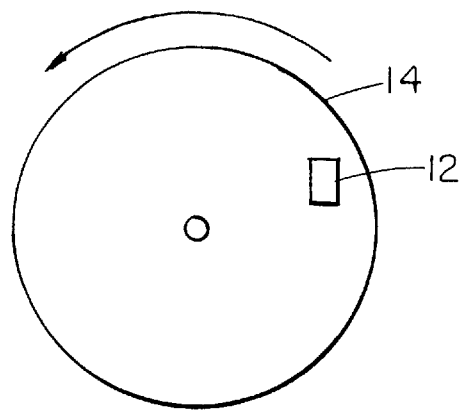
FIG. 1 is a front view of the improved system for monitoring the temperature of a rotating device showing the rotating device with the sensor attached on the outer or inner surface.
Figure 2:
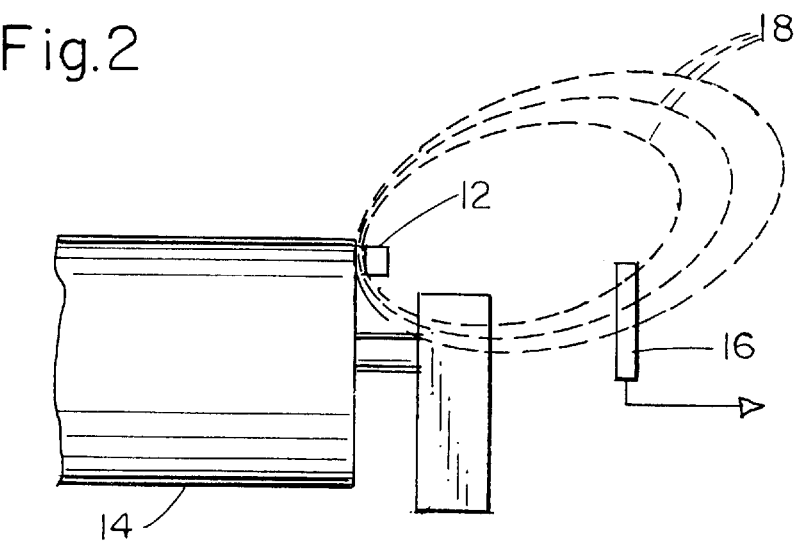
FIG. 2 is a side view of the improved system for monitoring the temperature of a rotating device showing the rotating device, the sensor attached on the outer surface of said rotating device, magnetic flux lines generated from said sensor and a pickup coil.

With reference to the drawings, FIG. 1 shows the sensor 12 mounted on the rotating device 14. The sensor 12 contains a temperature sensitive crystal having a temperature range applicable to the industrial application. As shown in FIG. 2, the pickup coil 16 is magnetically coupled to the sensor 12. The pickup coil 16 must be placed within the appropriate proximity of the sensor 12 in order to be within the flux lines 18. Sensor 12 transmits at the low frequency of 262 kHz and various other discrete frequencies.

Figure 3:
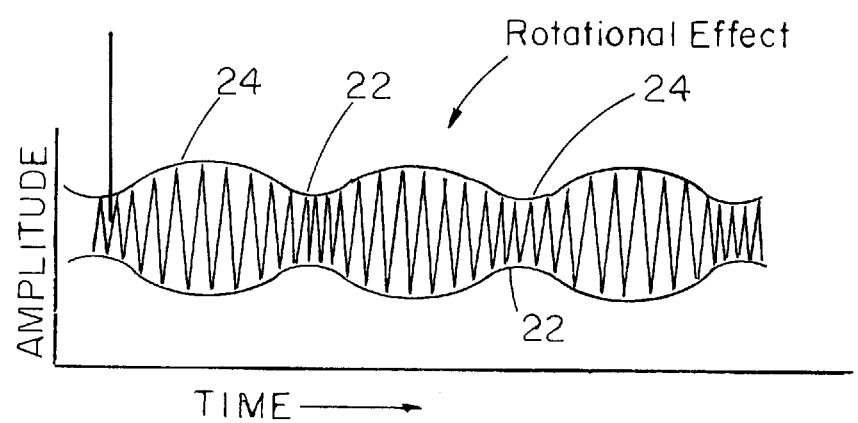
FIG. 3 shows an amplitude spectrum for summed amplitude modulation for receiving a transmitted signal from the sensor on the rotating device under ideal conditions.

Under ideal conditions, the pickup coil 16 would detect most of the magnetic flux 18 generated by the sensor 12 which would produce a first amplitude spectrum 28 as shown in FIG. 3. When the sensor 12 is in close proximity to the pickup coil 16 the signal measured would be at a signal maximum 24 and when the sensor 12 is at its furthest point to the pickup coil 16 the signal measured would be at a signal minimum 22.

Figure 4:
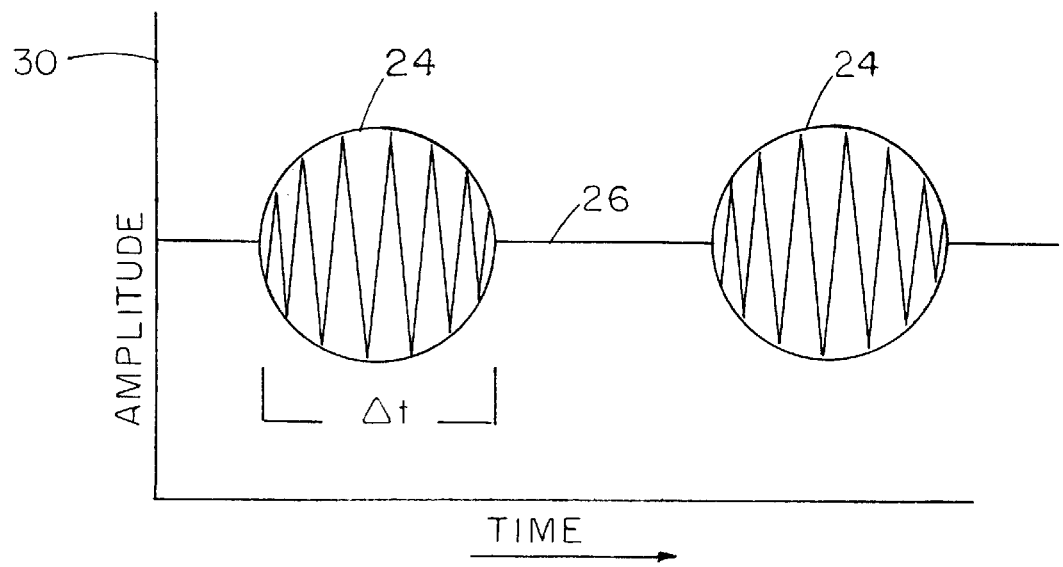
FIG. 4 shows an amplitude spectrum for summed amplitude modulation for receiving a transmitted signal from the sensor on the rotating device where there is some interference in receiving the transmitted signal.
Figure 6:
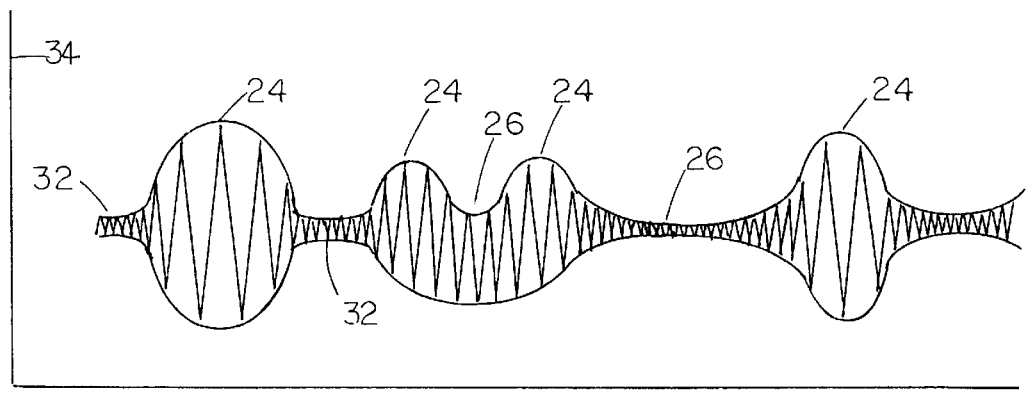
FIG. 6 shows an amplitude spectrum for summed amplitude modulation for receiving a transmitted signal from the sensor on the rotating device where there is some interference and false signal produced in receiving the transmitted signal.

However, when the sensor 12 is employed in practical use, the placement of the sensor 12 and the pickup coil 16 is usually not ideal. Most frequently, the pickup coil 16 is not able to receive the flux lines 18 generated by the sensor 12 at some point in the rotation of the device 14. Examples showing a loss of signal 26 from the sensor 12 are shown in FIGS. 4 and 6. FIG. 4 depicts a second amplitude spectrum 30 for summed amplitude modulation for receiving a transmitted signal from the sensor 12 on the rotating device 14 where there is some interference 26 in receiving the signal maximum 24 from the transmitted signal.

Whereas, FIG. 6 shows a third amplitude spectrum 34 for summed amplitude modulation for receiving a transmitted signal from the sensor 12 on the rotating device 14 where there is some interference 26 and false signal 32 produced in receiving the signal maximum 24 from the transmitted signal. FIG. 6 is the expected signal reception without the enhancements of the present invention.

Figure 5:
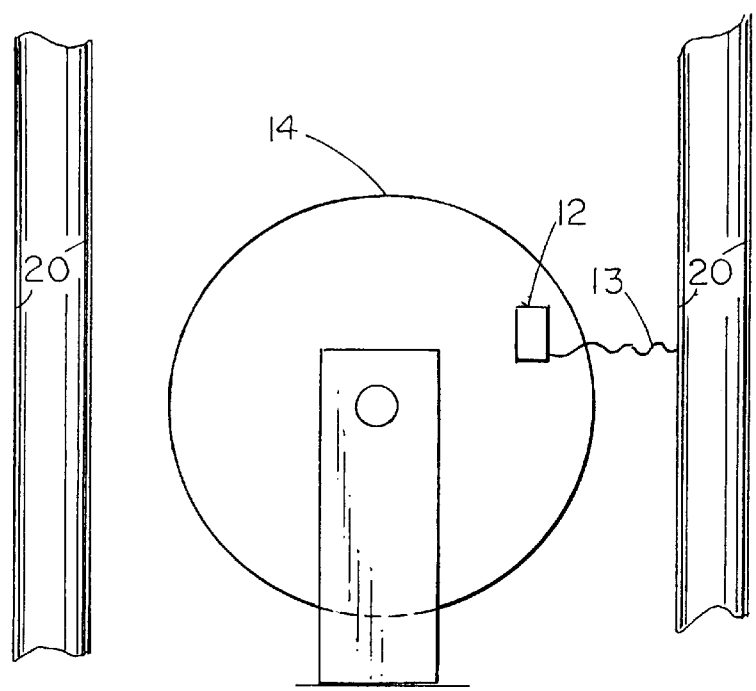
FIG. 5 is a front view of the improved system for monitoring the temperature of a rotating device showing the rotating device with the sensor attached on the outer or inner surface of said rotating device and steel structures located within the transmission environment of the sensor.

FIG. 5 is a front view of the improved system for monitoring the temperature of a rotating device showing the rotating device 14 with the sensor 12 attached on the outer surface of said rotating device 14 and steel structures 20 located within the transmission environment of the sensor 12. An example of these steel structures 20 could be pipe lines in an industrial facility. The system for monitoring the temperature of a rotating device could be precisely tuned for detecting a signal generated by the sensor 12 on the rotating device 14 in a set environment. However, a steel structure 20 such as a small metal fitting on a pipe line in the proximate area could alter the ability of the monitoring system to accurately detect the transmitted signal 13 from the sensor 12 to the pickup coil 16. Therefore, the present invention employs a low frequency signal from the sensor 12 which translates into a large wavelength which allows the signal 13 to communicate around steel structures 20 due to the fact that large wavelengths tend to bend around steel objects. Whereas, an RF based system would require higher frequencies thereby shorter wavelengths which would be more easily interfered with by steel structures 20 in the vicinity of the signal 13. Further, a magnetic link can be more easily tuned in comparison to an RF system.

Figure 7:
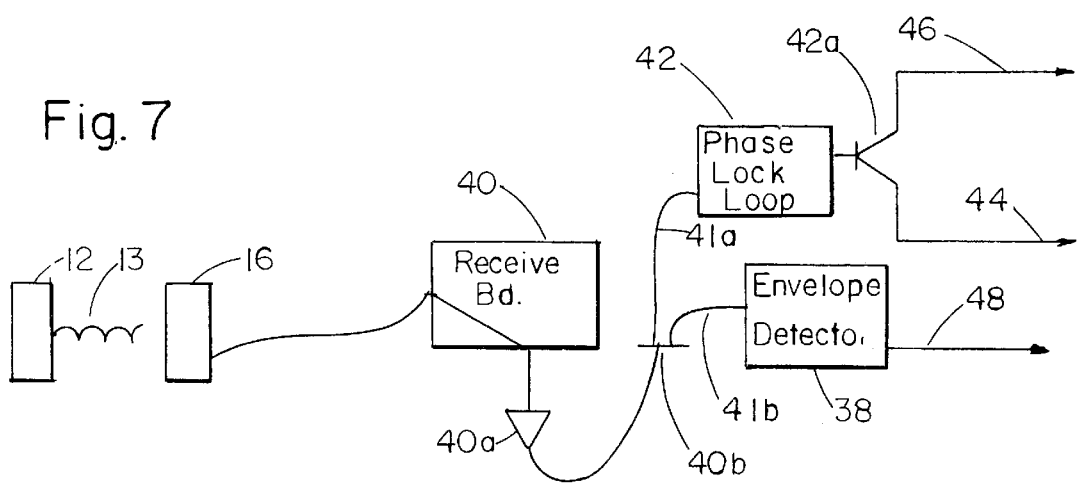
FIG. 7 is a schematic drawing of the improved system for monitoring the temperature of a rotating device showing the main components used.

FIG. 7 is a schematic drawing of the improved system for monitoring the temperature of a rotating device showing the sensor 12 sending a signal 13 to pickup coil 16 connected to a receiver 40 having a first amplification means 40a. The first amplification means 40a amplifies the signal 13 which is then split through a first splitting means 40b producing a first amplified signal 41a and a second amplified signal 41b. The first amplified signal 41a is sent to a phase lock loop 42 and the second amplified signal 41b is sent to an amplitude discriminator 38. The phase lock loop 42 outputs through a second splitting means 42a a signal 46 and a valid frequency 44. The amplitude discriminator 38 outputs a valid amplitude 48.

Figure 8:
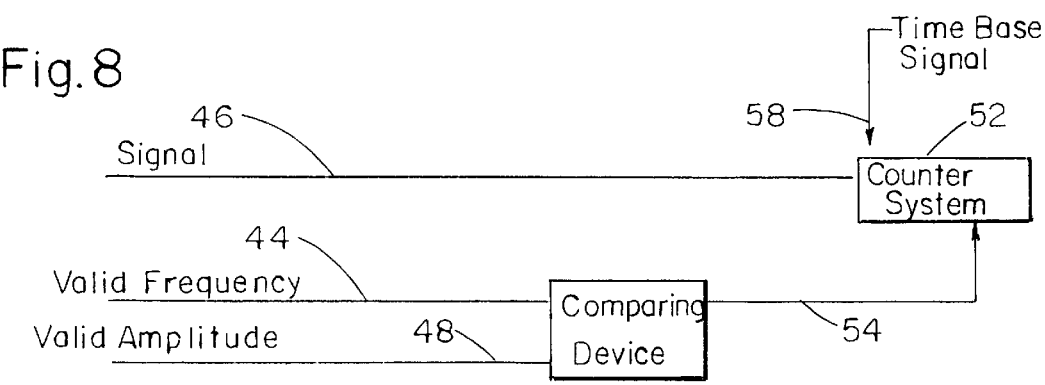
FIG. 8 is a schematic drawing of the improved system for monitoring the temperature of a rotating device showing how the signals received from the sensor are compared and validated and then transmitted to a counter.

FIG. 8 is a schematic drawing of the improved system for monitoring the temperature of a rotating device showing the signal 46 inputted to a counter 52 and valid frequency 44 and valid amplitude 48 sent to a comparing device 50 such as a NAND GATE device, which then outputs a signal valid 54 to counter 52. In addition, a time base signal 58 is inputted to a separate counter 52.

Figure 9:
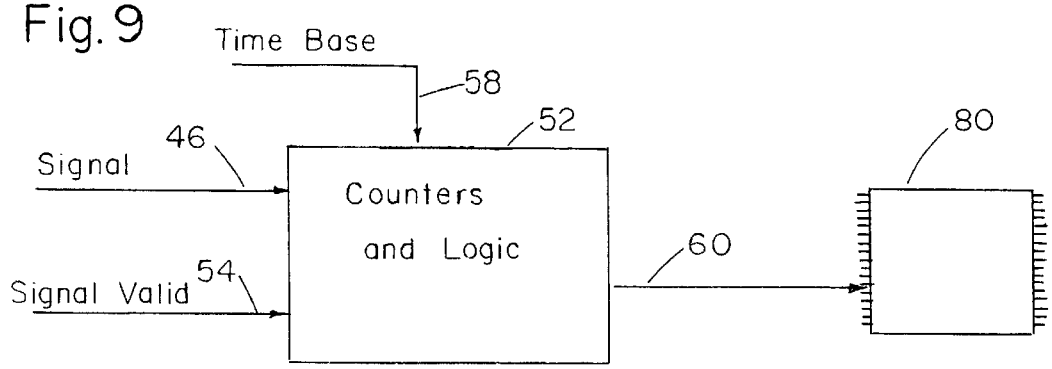
FIG. 9 is a schematic drawing of the improved system for monitoring the temperature of a rotating device showing how the signals received from the sensor are compared and validated and then transmitted to a counter.

FIG. 9 is a schematic drawing of the improved system for monitoring the temperature of a rotating device showing signal 46 being inputted into counter 52 along with signal valid 54 and time base signal 58. A count computed 60 is then outputted from counter 52 to a microprocessor 80 for computation of temperature. The microprocessor 80 is also capable of reading and recording the temperature both periodically and continuously.

Figure 10:
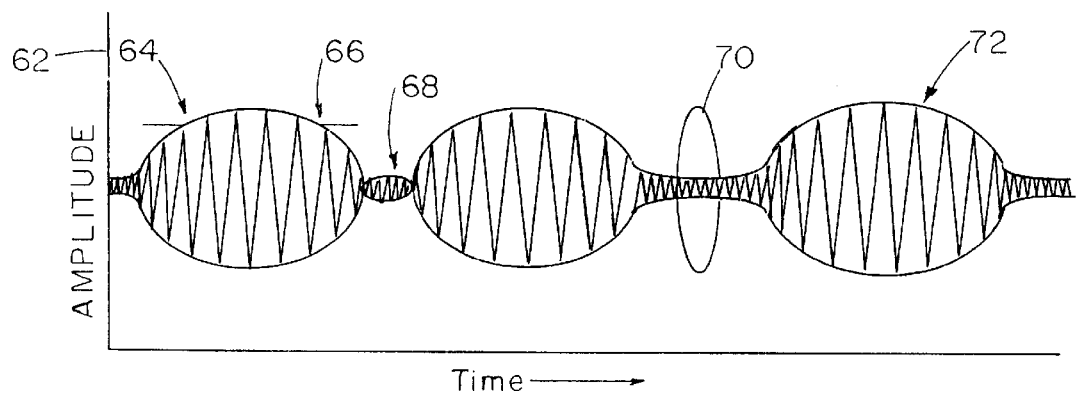
FIG. 10 shows an amplitude spectrum for summed amplitude modulation for receiving a transmitted signal from the sensor on the rotating device where there is some interference and false signal produced in receiving the transmitted signal in accordance with the invention.

FIG. 10 shows a fourth amplitude spectrum 62 for summed amplitude modulation for receiving a transmitted signal from the sensor 12 on the rotating device 14 showing a valid signal 64, a valid frequency 66, an invalid signal 68 an invalid frequency 70 and a valid amplitude 72.

Figure 11:
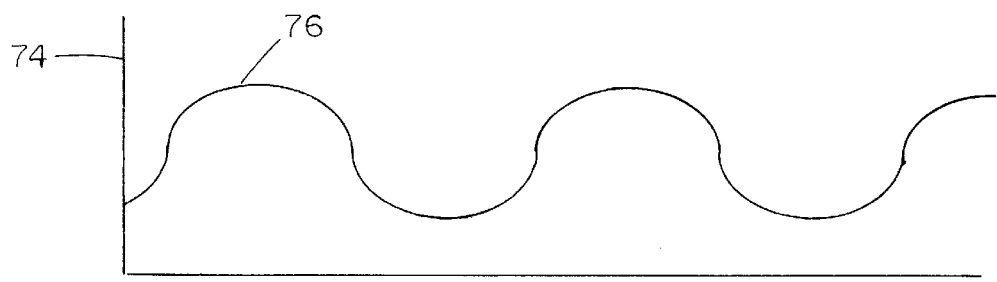
FIG. 11 shows an amplitude spectrum after being corrected in accordance with the invention.

FIG. 11 shows a fifth amplitude spectrum 74 for summed amplitude modulation for receiving a transmitted signal from the sensor 12 on the rotating device 14 showing the envelope of a signal 76 after being corrected in accordance with the invention.

Similar reference characters refer to similar parts throughout the several views of the drawings.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,

What is claimed is:

1. An improved system for monitoring the temperature of a rotating device comprising:

a sensing means responsive to temperature stimuli of a rotating device thereby producing a signal;

an antenna means responsive to said signal of said sensing means coupled to a receiver means;

an amplification means coupled to said receiver means;

a first splitting means coupled to said amplification means for splitting said signal from said amplification means into a first amplified signal and a second amplified signal;

a phase lock loop circuit coupled to said first amplified signal;

a second splitting means coupled to said phase lock loop circuit outputting a valid frequency signal and said first amplified signal;

an amplitude modulation discriminator means coupled to said second amplified signal for validating an amplitude of said second amplified signal thereby producing a valid amplitude signal;

a comparing device coupled to both said valid frequency signal and said valid amplitude signal for comparison of said valid frequency signal and said valid amplitude signal whereby said comparing device produces a control line signal;

a counter logic circuit receiving said control line signal, said first amplified signal of said second splitting means, and a time based signal whereby said control line signal, said first amplified signal of said second splitting means, and said time based signal are synchronized;

said counter logic circuit producing a synchronous signal; and a microprocessor coupled to said synchronous signal for calculating the temperature of said rotating device based on said synchronous signal.

2. The improved system for monitoring the temperature of a rotating device as claimed in claim 1, wherein said signal produced by said sensing means transmitting at least at a frequency of 262 kHz.

3. The improved system for monitoring the temperature of a rotating device as claimed in claim 1, wherein said signal produced by said sensing means having a magnetic flux.

4. The improved system for monitoring the temperature of a rotating device as claimed in claim 1, wherein said sensing means is a wireless device.

5. The improved system for monitoring the temperature of a rotating device as claimed in claim 3, wherein said antenna means is a pickup coil designed to detect the magnetic flux generated by said sensing means.

6. The improved system for monitoring the temperature of a rotating device as claimed in claim 1, wherein said counter logic circuit synchronizes in an asynchronous manner.

7. The improved system for monitoring the temperature of a rotating device as claimed in claim 1, wherein said comparing device is a NAND GATE device.

8. The improved system for monitoring the temperature of a rotating device as claimed in claim 1, wherein said microprocessor further includes means for periodical and continuous reading of temperature.

* * * * *